(12) United States Patent
Stoll et al.

(10) Patent No.: US 8,655,484 B2
(45) Date of Patent: Feb. 18, 2014

(54) LOCALLY CONTROLLED MATERIAL TRANSPORT

(75) Inventors: Thomas Stoll, Karlsruhe (DE); Kai Furmans, Waldbronn (DE); Frank Schoenung, Graben-Neudorf (DE); Stephan Mayer, Neuhausen (DE)

(73) Assignee: Karlsruher Institut fuer Technologie, Karlsruhe (DE)

( * ) Notice: Subject to any disclaimer, the term of this patent is extended or adjusted under 35 U.S.C. 154(b) by 138 days.

(21) Appl. No.: 13/131,274

(22) PCT Filed: Nov. 27, 2009

(86) PCT No.: PCT/DE2009/001670
§ 371 (c)(1),
(2), (4) Date: Sep. 13, 2011

(87) PCT Pub. No.: WO2010/060419
PCT Pub. Date: Jun. 3, 2010

(65) Prior Publication Data
US 2012/0004766 A1    Jan. 5, 2012

(30) Foreign Application Priority Data
Nov. 28, 2008 (DE) .................. 10 2008 059 529

(51) Int. Cl.
*G06F 7/00* (2006.01)
(52) U.S. Cl.
USPC .......... 700/228; 700/213; 700/223; 700/226; 700/230

(58) Field of Classification Search
None
See application file for complete search history.

(56) References Cited

U.S. PATENT DOCUMENTS

| 6,240,335 | B1 | 5/2001 | Wehrung et al. |
| 6,853,876 | B2 | 2/2005 | Wehrung et al. |
| 2004/0134755 | A1 | 7/2004 | Sticht et al. |
| 2008/0077254 | A1 | 3/2008 | Jeske |

FOREIGN PATENT DOCUMENTS

| EP | 1 897 825 | | 3/2008 |
| EP | 1897825 A1 | * | 3/2008 |
| WO | 00 71445 | | 11/2000 |
| WO | WO 0071445 A1 | * | 11/2000 |
| WO | 02 072453 | | 9/2002 |
| WO | 2006 102691 | | 10/2006 |

OTHER PUBLICATIONS

International Search Report Issued May 7, 2010 in PCT/DE09/001670 filed Nov. 27, 2009.

* cited by examiner

*Primary Examiner* — Yolanda Cumbess
(74) *Attorney, Agent, or Firm* — Oblon, Spivak, McClelland, Maier & Neustadt, L.L.P.

(57) ABSTRACT

The invention relates to a multidirectional transport module having a control system for the goods pack movement direction and having an interface for communication with other transport modules. In this case, the invention provides for the control system to be designed to reserve the transport module for the transport of at least one goods pack in a given goods pack movement direction, in response to signals received via the interface.

15 Claims, 6 Drawing Sheets

LOCALLY CONTROLLED MATERIAL TRANSPORT

Figure 1:
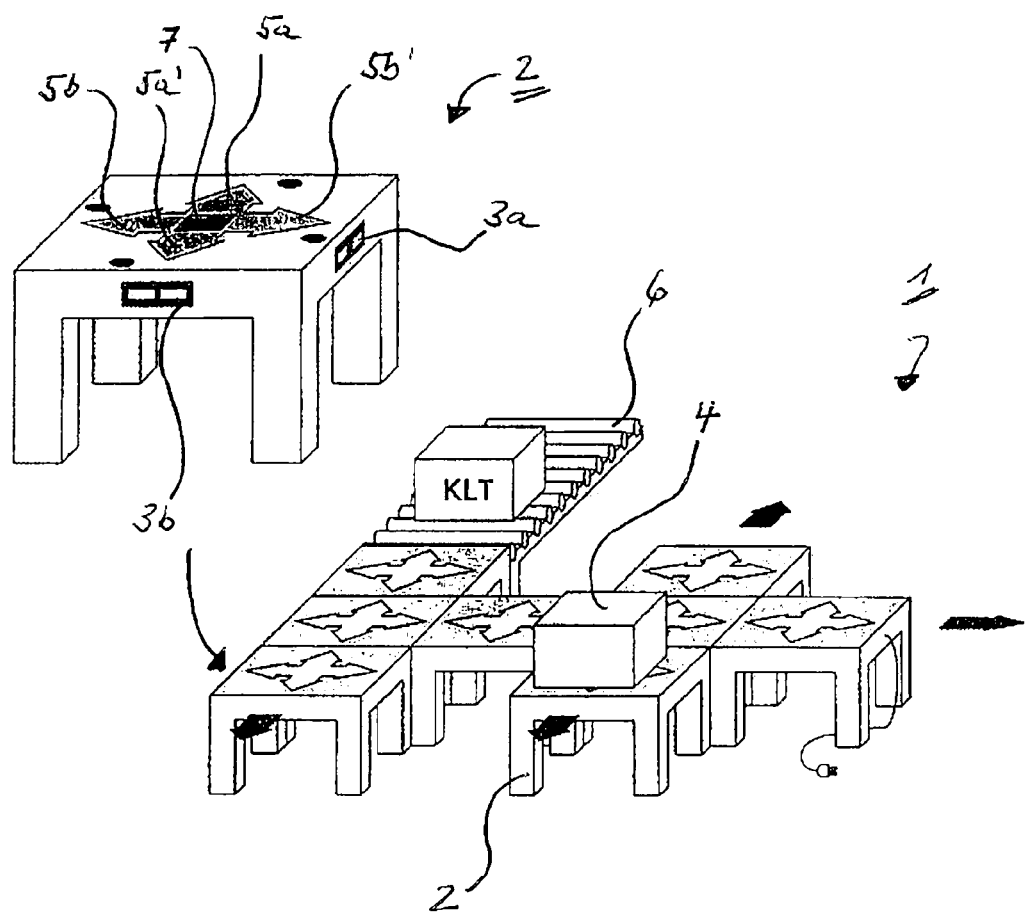

The present invention relates to what is claimed in the title, and therefore relates to the transport of objects.

The transport of objects is known and may comprise relatively complex distribution tasks, for example when transporting suitcases from the check-in buildings of an airport to the corresponding terminals. The aim here is for rapid transport, which should be free of errors, even when suitcases have to be sent to different terminals from a single check-in desk.

A further example is the transport of manufacturing materials in manufacturing businesses. In this case, objects to be processed must be sent from a store to the processing stations. The respective finished products, such as screws of a specific size, in this case often have to be transported to different points, for example different final assembly stations; this is frequently done by using transport containers such as boxes which, after the objects to be transported have been removed, must be transported back again as empty boxes. This is typically achieved by transporting the containers on a circuit.

The control of transport systems such as these is complex and susceptible to errors, simply because of their complexity. This becomes even more true when further demands are placed on the transport system, for example those for transporting specific objects with a higher priority.

A transport system having a conveyor belt is known from US 2007/0,059,144 A1. This document proposes that objects be individually moved from a source conveyor belt to a destination conveyor belt by means of a lift.

US 2004/0,084,284 describes a transport route which is provided with driven rollers, with a control system driving the rollers in groups.

US 2007/0,222,612 describes a conveyor belt composed of elements like a caterpillar track, which are each equipped with an RFID transponder.

U.S. Pat. No. 6,021,888 describes a transport system comprising transport elements which are connected in series and can detect the presence of objects on the rollers of the transport means, and can activate or stop the drive units for the transport means, in response thereto. The individual adjacent units can interchange information with one another. The document states that, in the case of systems with a central control system, in which each transport unit is intended to be addressed individually, a high level of wiring complexity is required. This document also addresses systems according to which selectable programs can be stored in individual transport modules, and a suitable program can be selected by selection of suitable memories in which the transport programs are stored.

The aim of the system in U.S. Pat. No. 6,021,888 is to allow fine positioning control for extended transport system units, and also to allow the transport lines to be changed at short notice. In addition, the document proposes that a transport unit be driven independently of whether sensors do or do not detect objects downstream.

U.S. Pat. No. 3,880,298 provides an endless conveyor belt, in the case of which objects are equipped with identifiable destination codes, and are passed on from the belt, corresponding to their destination codes into output paths which run transversely with respect to the belt.

EP 1 362 645 A1 discloses an installation for processing of returns, in which at least one assessment station, from which the returns are taken from a feed conveyor belt for assessment, and an output conveyor belt for transporting the returns away from the assessment station and an input device, are intended to be provided, and in which the output conveyor belt is intended to be subdivided into identifiable segments, and the control device has a selection module for the output transport means, which is intended to be designed to use the data record to determine a destination segment on the output conveyor belt for each return, and an output apparatus is intended to be provided, which is controlled by the control device, in order to output the destination segment.

U.S. Pat. No. 4,240,538 discloses a transport arrangement by means of which arriving magazines can be distributed to one of three outputs.

US 2003/0,075,416 A1 discloses a method and an apparatus for measurement and sorting of packs, including the concept of determination of at least one component of the center of gravity of the packs, wherein the determination of the center of gravity component comprises the use of an inclination operation in conjunction with the use of sensors for detection of the movement of the packs during the inclination. The known apparatus relates to high-speed sorting systems.

US 2002/0,010,527 A1 discloses a control system for a modular transport system having a driven roller for movement of objects on the modular transport system, and having an object sensor for detection of objects on the modular transport system, wherein the control system comprises a drive control system which is arranged to control a motorized roller; a communication interface which is adapted to connect the control system to an address-based network, in order to send output addressed data to other apparatuses in the address-based network, and to receive addressed data from the address-based network; and a logic system which is adapted to receive a signal from one of the object systems and from the communication interface; and to provide a roller control system to the driven roller depending on the input signal. It is proposed that a central control system be provided which can be eliminated after the configuration of the system, such that the system can subsequently operate without central control. The document admittedly states that transport monitoring strategies such as separation, accumulation and the like can be implemented automatically without central control by communication of the individual elements, and that states such as the presence of an object can be communicated to other transport modules.

US 2006/0,293,784 A1 discloses an automatically distributing sales system. The aim in this case is to provide a central computer which controls the entire system.

WO 2006/102691 discloses an electrically locally controllable transport apparatus for piece transport goods, comprising at least one electrically controllable drive apparatus for at least one transport member, and/or at least one electrical detection apparatus for operation-relevant states, wherein the drive apparatus and/or the detection apparatus are/is connected to an electrical control apparatus for controlling the procedures of the transport apparatus, and the control apparatus has at least one wire-based or line-based communication interface for the data link to the control apparatus of a further transport apparatus, with the aim that at least one control apparatus has at least three, preferably four, functionally identical standard communication interfaces for the data link to communication-compatible control apparatuses, of preferably immediately adjacent transport apparatuses, or transport apparatuses which continue the transport route. This document also proposes that the communication interfaces be formed by ETHERNET ports. The control apparatus is intended to be designed and/or programmed to carry out an addressable routing function for incoming data packets.

This document also proposes that a microcontroller, which is associated with the control apparatus for the locally controllable transport apparatus, be designed to form a priority sequence for the processing and handling of the data packets on receiving a plurality of data packets with different priority identifications, that the microcontroller be designed to receive and evaluate as well as to create and dispatch data packets, and that the control apparatus be designed to determine the transport load level and the transport goods load level on the transport apparatus, and to record and/or pass on the determined data. The aim of this system is to provide an electrically controllable transport apparatus in order to form a cohesive transport system with junctions, which allows an extensive data network to be set up easily between the individual transport apparatuses, while furthermore or nevertheless achieving increased availability and fail-safety for a transport installation which is formed through a plurality of transport apparatuses.

With the known arrangement, it is possible to centrally predetermine the material flow along a transport system, without predetermining the processes which are exactly required at an individual point in the transport system, such as switching the transport means for a transport module on and off, switching a longitudinal or lateral transport on and off, etc. Nevertheless, a central system, which is referred to as a material flow computer, is required and determines the routes in which an object is intended to take from a starting point to a destination point. The systems formed with modules such as these are still very complicated from the control-engineering point of view.

The requirement to access a central computer which controls the material flow still makes it harder to configure transport systems. Particularly in the case of paths which are highly networked between a multiplicity of potential dispatch points and a multiplicity of possible receiving points, this results in extremely complex systems, which can be controlled centrally only with difficulty, in particular exacerbating adaptation, for example by adding further sources or dispatch stations, or dispatch or removal points, for example when manufacturing suddenly has to be carried out at a greater number of workstations in an industrial concern, because there are a large number of orders.

As the Internet shows, networks admittedly exist in which transmission files can be set up on a self-organized basis, but the transmission of data differs in many respects from the transport of objects. For example, in the case of data transmission, it is normal practice to split large data packs, to send them successively and, possibly, also to accept that different data packet parts will travel on different routes; this is obviously impossible for actual objects.

It is also possible to temporarily store the incoming data packets in data networks, before they are passed on, and although in principle it would be possible to carry out temporary storage, in a similar manner to that in the case of data routers and data switches at nodes in a material flow system, this would be extremely complex and is in general unacceptable. Care must therefore be taken to ensure that material packs can pass through a route with as little impediment as possible. Otherwise there is a risk of the entire system being shut down over a relatively long period.

Furthermore, data collisions occur very frequently in typical data networks, for example when both subscribers attempt to speak at the same time during a bidirectional communication. Since the packs which have collided are still stored with the respective sender, until correct reception is confirmed, they can be resent at any time, and a collision is therefore not critical.

It will be desirable to allow the configuration of material flow systems to be simplified, for operation to be freer of disturbances, and at the same time to allow a cost-effective material flow system to be provided. It would also be desirable to comply at least partially with at least some of these requirements.

The object of the present invention is to provide something new for industrial application.

The achievement of this object is claimed in an independent form. Preferred embodiments can be found in the dependent claims.

A first fundamental idea of the present invention is therefore to provide, in the case of a multidirectional transport module having a control system for the goods pack movement direction and an interface for communication with other transport modules, that the control system is designed to reserve the transport module for the transport of at least one goods pack in a given goods pack movement direction, in response to signals received via the interface.

It should be stressed that the control system is provided locally at the transport module and, to this extent, each transport module according to the invention has its own control system, as a result of which a multiplicity of local control means are provided in a transport system which is configured using transport modules according to the invention.

The present invention has therefore identified that an autonomous transport system, that is to say a transport system in which the material flow need not necessarily be controlled, in the present sense, by a central control system, can be produced for material flows, if the individual modules are designed to be reserved for the transport of goods packs. Since the individual transport modules in a system negotiate with one another, before the actual transport of goods, that is to say the physical flow of the material, as to how the material flow should take place, it is possible to avoid situations in which mutual blocking could otherwise occur. In this case, multidirectional means a transport module which allows transport in two opposite directions. This is provided in the simplest case by a linear transport route through which goods packs can be passed in two directions; furthermore, multidirectionality is also provided when, for example, a three-sided transport module can pass on a goods pack received from one direction in one of the two remaining directions, as mentioned. Typically and particularly preferably, the transport modules are designed to transport goods packs in four directions, specifically "forward and backward" and "to the left and right", that is to say on two mutually perpendicular axes. However, for the sake of completeness it should also be mentioned that other geometries would be possible, for example hexagonal modules or the like. The preference for quadrilateral, in particular square, modules is justified by the fact that, in this case, the motor drive for the movement directions can be configured particularly easily in a manner known per se. The fact that transport means are provided on the transport module for the actual transport of goods packs, which transport means are driven by a motor, typically by an electric motor, will be evident. In a situation such as this, the control system is designed to operate the appropriate transport means of the transport module as required, and possibly on a reserved basis.

It should be mentioned that the transport module can be equipped with local intelligence which provides and/or improves a suitable drive for the motors, for example by avoiding jerky starting, consideration of maximum permissible accelerations, permissible lateral accelerations, control actions which are dependent on the goods pack, and the like.

It is also particularly preferable for the transport module to be able to identify a goods pack to be transported. Identification means are preferably provided for this purpose, such as barcode readers or, and this is equivalent here, readers for other graphic identification marks, RFID transponders, weight sensors for detection of a characteristic goods pack weight, size sensors, color sensors or cameras, in particular with image recognition that is suitable for goods pack identification. Identification means such as these will not be described in any more detail here since, to this extent, they are known by a person skilled in the art.

The logic interface via which the control system can receive and/or send signals will typically have a multiplicity of physical inputs and outputs; it is particularly preferable for the interface for each neighboring module which can be attached to the transport module to have its own input and/or output; this reduces the wiring complexity when constructing a material flow system to the provision of nearest-neighbor connections. The wiring can then be made particularly simple. In the preferred variant, in particular, the communication preferably takes place by means of nearest-neighbor communication. It should be mentioned that there are also other communication options, apart from this. It would, per se, be sufficient to connect each transport module to a large network. However, particularly in the case of extended material flow systems, this will then result in a not inconsiderable wiring complexity, with correspondingly high susceptibility to faults.

It is particularly preferable for the control system to be designed to store topology information relating to the material flow transport system in which it is arranged. Topology information such as this could be downloaded to the individual transport module, that is to say it could be configured, during setting up or configuration of the material flow transport system; however, it is preferable for the control system or the individual transport module to be able to receive topology information relating to the entire system, at least to the required extent, and to construct this autonomously; this considerably reduces the effort during commissioning and/or during modifications to the system, particularly also when individual modules fail.

Accordingly, the control system is preferably designed to complement and/or to update its stored topology information by communication with other modules, in particular by interchanging routing tables. In this case, in a first initialization step, each neighboring module is first of all signaled only its own identification number and a corresponding identification number is received, the port—that is to say appropriately associated with the input/output designation, is stored with the distance; the manufacturer can ensure that each transport module receives a unique transport module identification; alternatively, different methods could be used if an identification number were to be allocated in a duplicated form; this does not need to be described in any more detail here.

After the first interchange with a neighboring module, the routing table then has the information relating to the neighboring modules located in individual directions added to it, and this may then be entered in the routing table, to which neighboring modules its own neighbors are in turn connected. If this step is repeated sufficiently often, each module is provided with a complete overview of the entire topology of the material flow system; in this case, it is assumed that the overall topology can be coped with and is manageable; in typical material flow transport systems, such as those which are used, for example, even in complex situations in very large industrial concerns or in airports which extend over a large area, this requirement can still be satisfied without problems, this is because the number of individual modules there is still manageable, and the routing tables can be stored at virtually no cost, on the basis of present-day prices for memory.

It should be noted that it is particularly preferable to collect the topology information not only in an initialization step, but also to regularly check whether topology information that has been obtained is still up-to-date. This does not always need to be the case, for example when parts of the system have been dismantled, when additions and/or extensions have been made, and/or when individual modules have become defective, which can either be signaled directly, for example only to neighboring modules or, by broadcast, to all the modules in the system, and/or if the systems which have become defective no longer respond in an expected time, which likewise indicates a defect. In this context, it should be noted that it is easily possible to provide a module, possibly by hand, for permanent transport in a single direction and for this also to be signaled, or for this to be able to be signaled, in an appropriately coded form to other, in particular neighboring modules, and/or to all modules, for example by a suitable broadcast signal or propagation of updated topology information, in order to minimize the overall disturbance to a system when problems occur.

The control system is preferably designed such that the module is reserved for the transport of a very specific goods pack. In particular, this allows the module to be released after the transport of the identified goods pack. It should be noted that the control system need not make the reservation immediately, when a reservation request occurs and also need not implement a reservation that has been made immediately, prior to the arrival of the goods pack. In fact, it may be sufficient for the reservation to be provided for a specific time period in the future. This is particularly relevant in the case of extended systems, in which the routes and therefore the transport times, which are considerable in any case in the material flow, are large. In this case, it is possible to check in advance whether the route will become free approximately in the expected or predetermined time period. The delay which actually occurs because of a module can also be taken into account autonomously if the expected time period for arrival of the goods pack at the transport module is also coded in the advance reservation request and, when the neighboring modules are checked to determine the handover of the expected goods pack for which the reservation is intended to be made, they are asked whether these will be ready to handover the goods pack at a time which corresponds to the expected arrival time in the requested module plus the expected transfer time, or the transfer time determined for a given goods pack, by the module. If there are restrictions relating to the maximum acceleration, the transport speed because of excessively higher loads and finite motor power etc., and these have already been signaled when the request was made, its own transfer time can even be correspondingly predetermined. This allows the general knowledge on which the invention is based to be used in a very particular manner to ensure that the goods pack flow can take account of the finite delay times of the goods packs. The check whether a route is free is in general very much faster than the actual transport process, even in complex systems and when the load level is high, and therefore does not represent a limiting variable, particularly when the communication paths are sufficiently fast and the computation speeds in the transport modules are adequate.

The actual reservation can preferably be made by a neighboring module which wishes to send a goods pack first of all accepting an advance reservation token, by an advance reservation being provided, and by the advance reservation token being passed on to a neighboring station which is located closer to the destination, possibly with changes, for example relating to the transfer time. The neighboring station which is located closer to the destination may in this case be determined on the basis of a stored topology. When the addressed downstream transport module receives the advance reservation token, a corresponding process will be carried out there and the advance reservation token is passed on to the destination module, if the intended transport route is completely free; it is then confirmed in the destination module, and is sent back as confirmation. The confirmation of the advance reservation token can then strengthen the advance reservation for the reservation. The fact that an advance reservation which arrives later remains unanswered and/or unprocessed when a plurality of advance reservations have arrived, until a decision is made that it cannot be carried out as a result of the strengthening of the previously arrived advance reservation relating to the reservation, and/or its rejection, is disclosed as a preferred option. The fact that, if required, an advance reservation request which arrives later can be dealt with in a preferred manner on the basis of a prioritization should be mentioned. Despite autonomy, prioritization can even be achieved for specific goods in the total goods traffic, for example if a second advance reservation request can be resent with a higher priority, for high-priority goods, irrespective of an advance reservation request which has already been passed to a port.

It should be mentioned that a neighboring module is considered to be closer to the destination if the destination can be reached via this neighboring module; this does not necessarily mean that the overall route or the overall delay time, as can also be stored in particular in the routing table as well, need be shorter. In fact, it is feasible for a destination to lie along a circuit which also includes the transport module and to have to choose a circumferential direction along the longer circular path, because modules which have already been reserved prevent passing on in the direction of the shorter route.

It is evident from the above that the module is typically designed to reject the acceptance of an advance reservation token if it is itself reserved. In addition, it is preferable to strengthen the advance reservation for the reservation only on confirmation by the destination module, because this ensures that modules which fail to answer because of a failure and which therefore fail to reject such acceptance only for this reason, are not arranged on the intended transport route.

As is evident from the above, the control system is therefore typically designed to pass on an advance reservation token corresponding to the goods pack destination coded therein and the topology information stored in the control system, in particular the topology information stored or held in a routing table. It is also evident that the control system is preferably designed such that, when downstream transport modules are busy or reject the advance reservation for other reasons, the respective transport module on the one hand cancels its own advance reservation and signals this on the other hand to the requesting, upstream transport module.

In addition, an advance reservation can be rejected simply if the respective module has already sent a corresponding token unsuccessfully to all, or to a sufficiently large number, of neighboring modules, without an advance reservation having been confirmed there as being strengthened for the reservation; however, in this context, it should be noted that this need not be done completely automatically for a token simply because an appropriate request has already been received. By way of example, the transport to a given transport module may take place via different routes, and therefore also routes with different length. Particularly when it is not just a simple reservation that has been made in the modules, but the reservation is also made for a specific future time or for an expected transport time period, the choice of different routes and, in particular, delays to goods pack reception caused by this and occur before the transport module can result in a situation in which the already reserved, downstream transport modules have become free again for goods pack acceptance at what is now a later time. If required, this is taken into account autonomously by the system.

Protection is also claimed for a complete material flow system having at least one, and preferably a plurality of multidirectional transport modules, according to the invention. It should be noted that material flow systems such as these can be operated completely autonomously.

Nevertheless, it would be feasible to use the autonomy only in the situation in which a central system has failed and/or only some of the advantages which can be obtained by the design of the transport modules according to the invention are made use of.

The material flow system will typically have junctions, with the multidirectional transport modules typically being arranged precisely at these junctions. Typically, at least some of the modules will have at least three, and preferably four, neighbors; where modules having four neighbors are provided, it is preferable for them not to be arranged in double circuits, that is to say for them to be used predominantly for lateral transport. The background to this is that, in topologies corresponding to a figure "8", particular problems can occur when the load level in the material flow system is very high. This can result in a decrease in the transport performance, which in some cases is considerable, as a result of high occupancy of the transport route.

If elements are provided where goods packs are input and output, then it is preferable for these elements to be temporarily reserved for their respective use as either only an input element or as only an output element. At the same time, it is preferable for the input and output elements not to be introduced into a linear transport route but into a lateral route, which leads to a linear transport route, in order to reduce build-ups in the goods pack transfer. It is particularly preferable for input and output modules to receive information relating to the usage level and/or reservation state from other modules, in particular from all the modules in the material flow system, and to be designed to input and/or output goods packs depending on the filling level or usage level of the system. The background to this is that the overall transport performance of a material flow system decreases considerably when modules are virtually fully occupied. In critical cases, in particular, it is possible to give priority to output processes. This is particularly important when some of the goods packs are circulated continuously while other goods packs have been input and/or output. In this case, prioritized output can result in the filling level being reduced to such an extent that the transport performance of the overall system rises again. In particular, prioritization can be achieved by canceling advance reservations again, and/or by sending rip-up signals upstream and downstream.

Protection is also claimed for a method for controlling a material flow system, in which the modules communicate with one another and, in the course of the communication, negotiate autonomously with one another with regard to material flow routes from a goods pack start to a goods pack destination, in particular with the protocols being configured such that deadlock situations caused by goods packs running into one another are avoided.

It should be noted that it is not absolutely essential to reserve the entire route even before the goods pack is released from the start; in fact, it is also possible to decide whether to actually pass on a pack to an individual module only when it arrives; in the case of modules which operate bidirectionally, this could, however, then result in the problem that two immediately adjacent modules wish to send packs between one another, thus leading to a classic deadlock situation.

In special cases, it is also possible to combine both methods with one another, that is to say advance reservation and reservation in real time shortly before passing on the goods pack. This is preferable, for example, because this first of all allows a route to be reserved; it is then, however, possible to check once again, before passing a goods pack on from a respective module, whether the previously agreed route should actually be used or whether, for example, a downstream module has become defective in the mean time, and/or whether, for example, it has become necessary in the mean time to output goods packs from a highly loaded system in order to improve the overall performance, and to this extent either delay the transport again or make a new route selection.

The autonomy makes it possible to build up the system quickly, to operate it and to modify it, without any problems.

It should also be mentioned that the term goods pack means all materials which are sent as a unit, for example comprising a basket with a multiplicity of different goods, etc.

It should be noted that it is possible when designing a system, once the modules have recorded the topology, for them, if necessary, to check with one another the topology information received by them and to replay this to a simulator unit which simulates various transport task situations and, if necessary, indicates weaknesses in the design before and/or during the actual commissioning process, and/or is additionally used for their analysis. For example, it is possible in this case, if necessary, to duplicate a route at critical points, or the like. A measure such as this allows existing resources to be used in an optimized manner.

It should also be noted that, particularly when highly loaded material flow systems are expected, it is possible for an individual module to pass on goods packs particularly slowly or with a delay, in order to wait for a downstream transport module, which was previously still blocked, to become free. It should be mentioned that it is also possible to reserve the desired route, if necessary, in addition only as far as the next node or an intermediate store (parking place).

It is therefore possible to implement various routing strategies, such as passing on the unit to be transported when the route is free to the port closest to the destination, the reservation of the route only as far as the next node, the reservation all the way through from the goods pack source to the goods pack destination, and/or discrete-time reservation.

Figure 2:
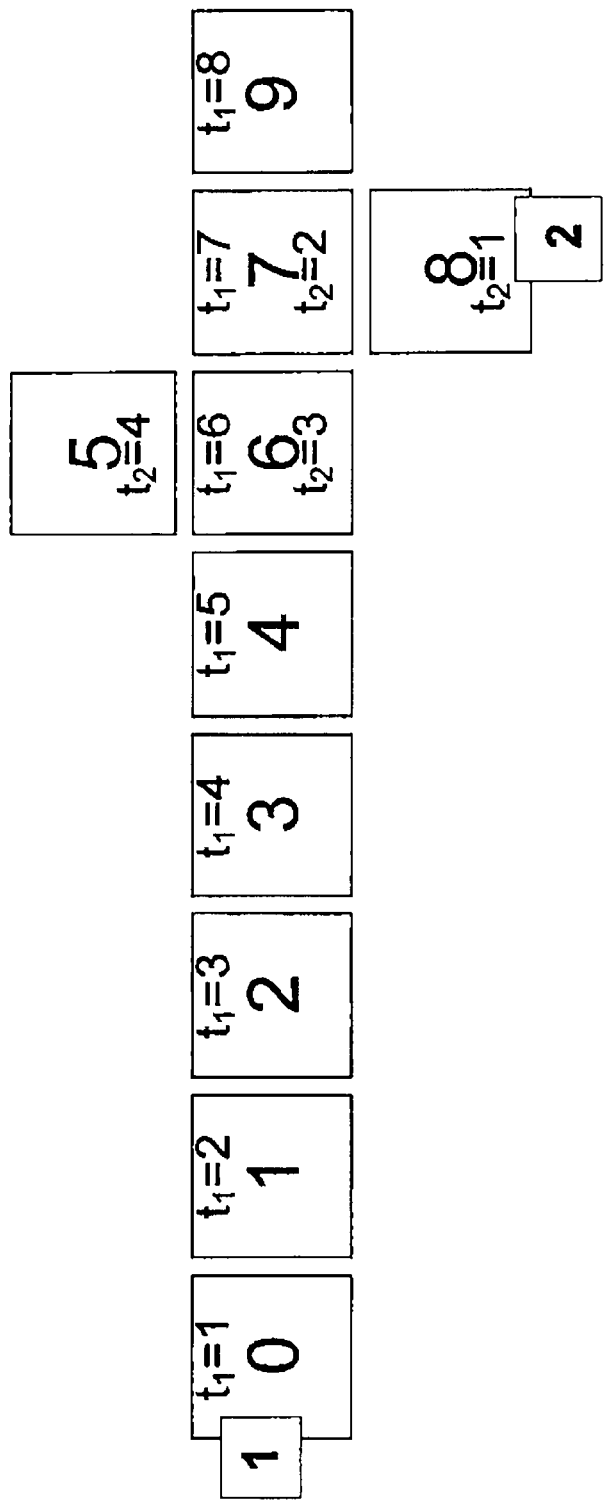
Figure 3:
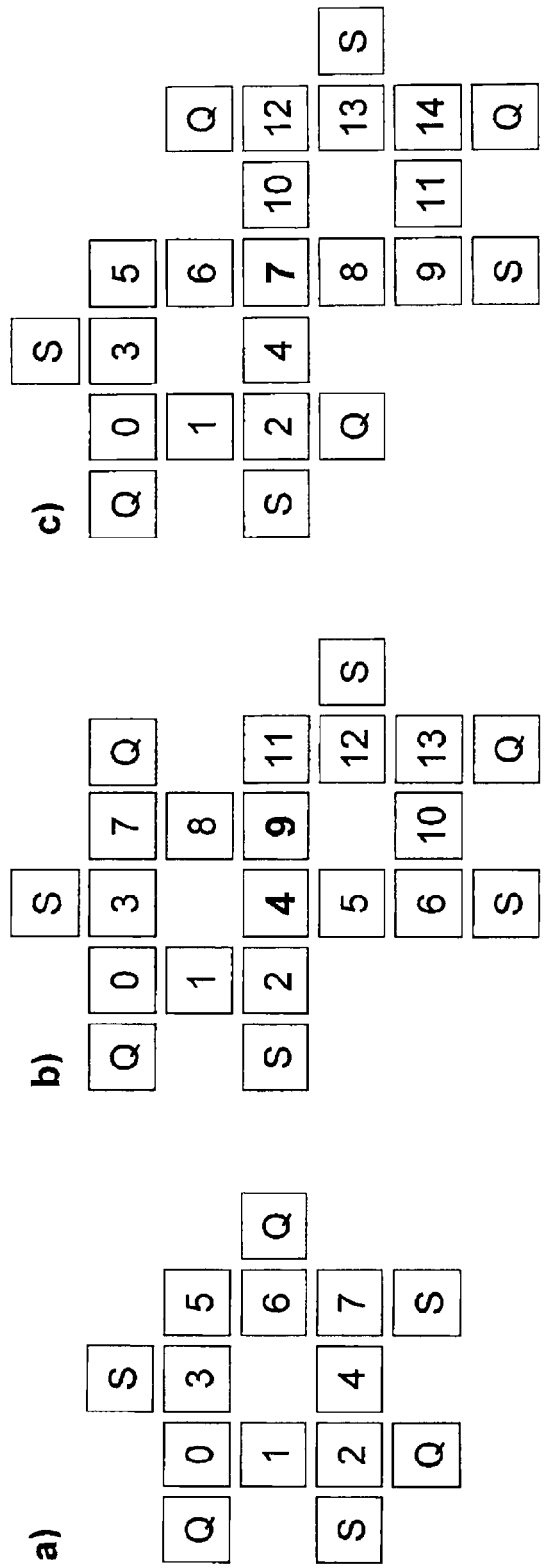
Figure 4:
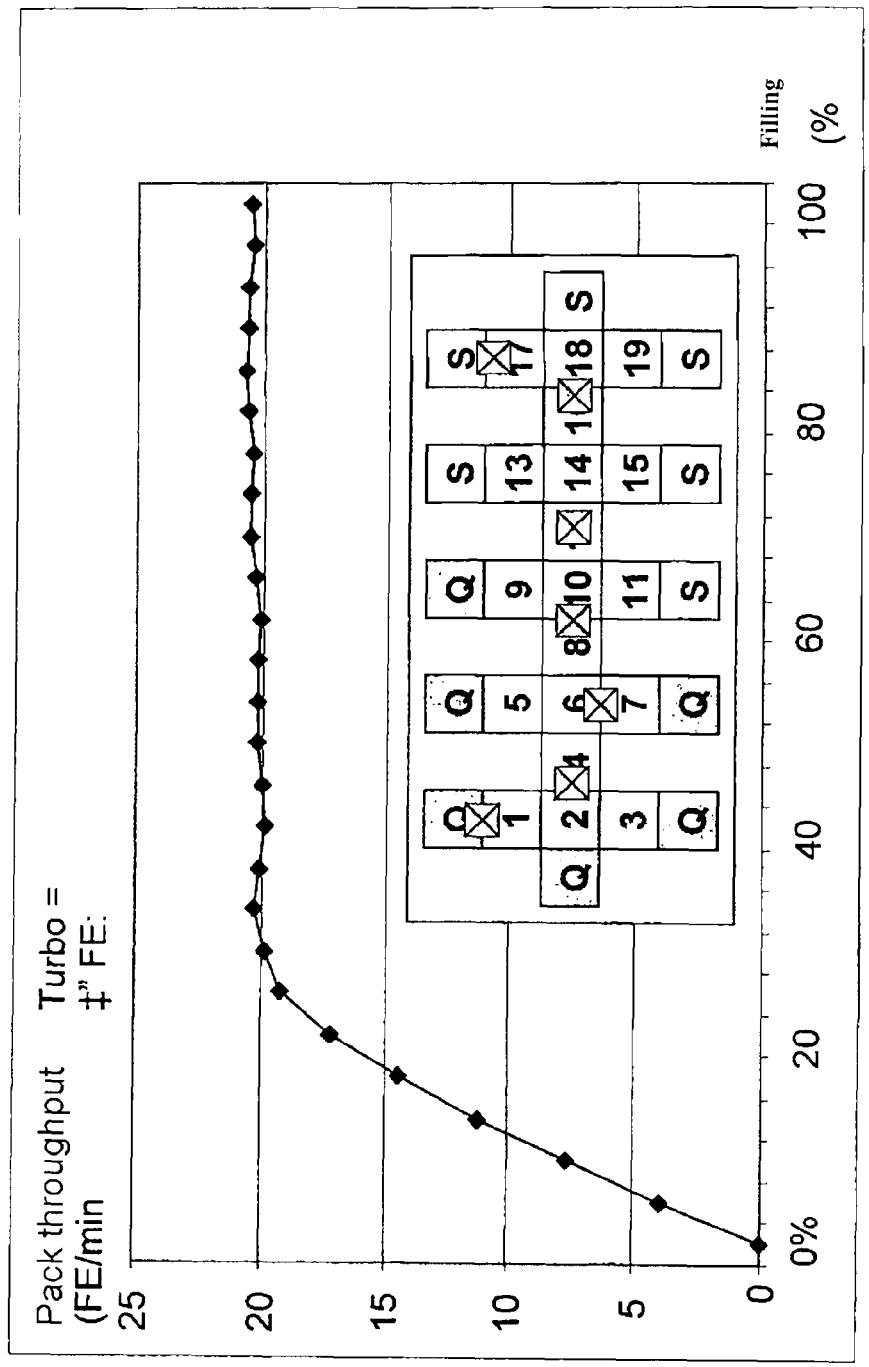
Figure 5:
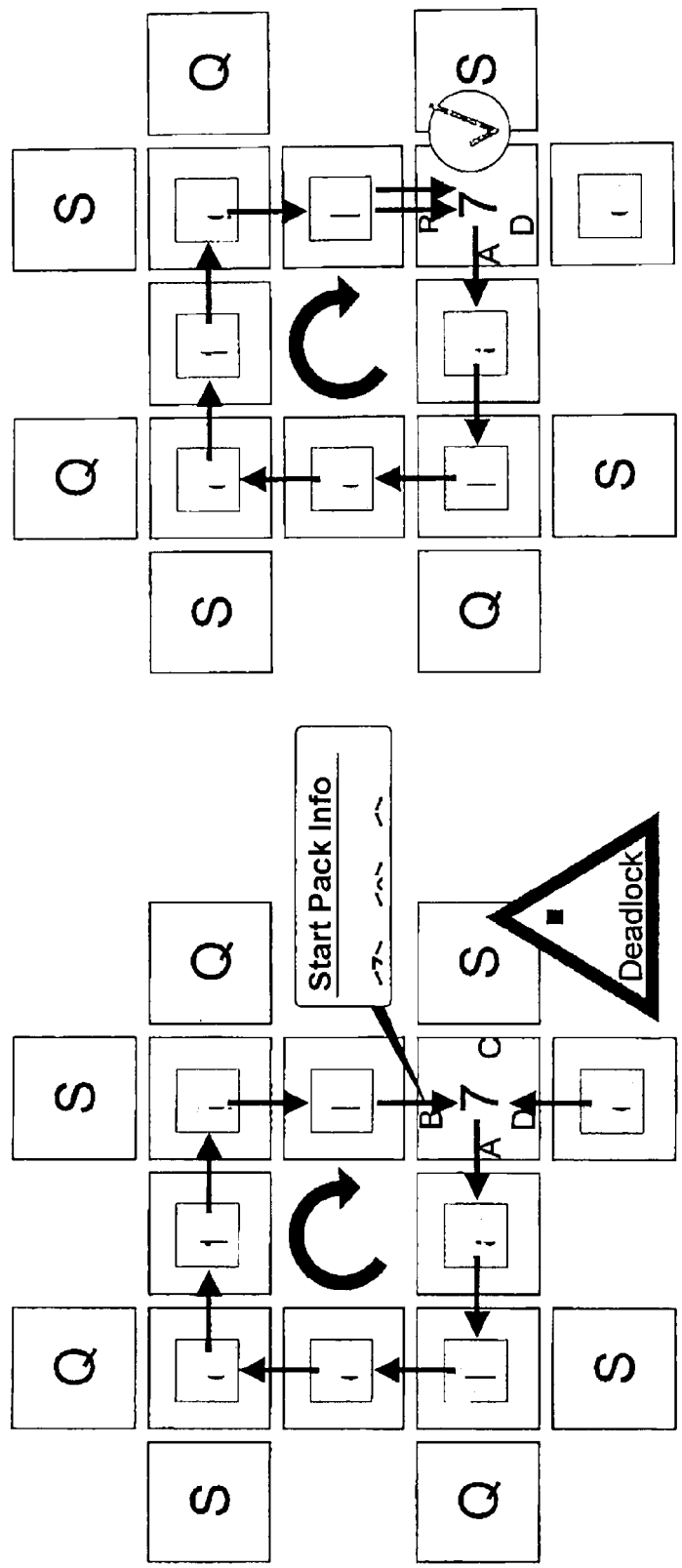
Figure 6:
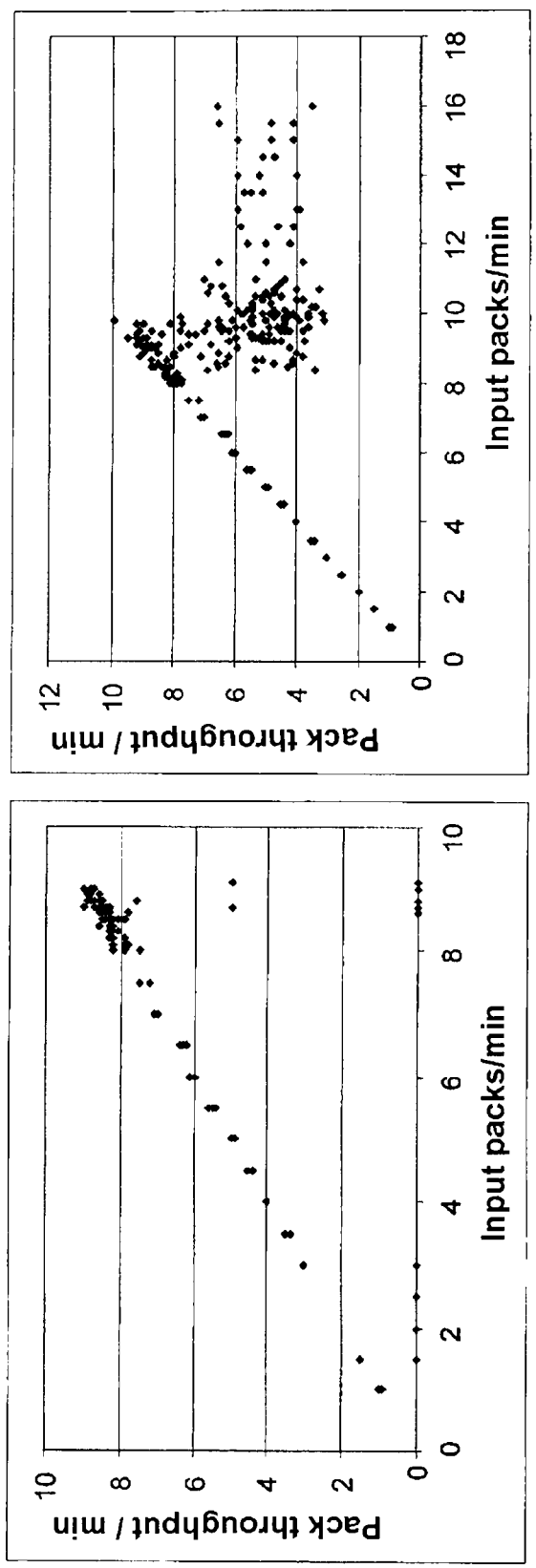

The invention will be described in the following text, simply by way of example, with reference to the drawing, in which:

FIG. 1 shows a material flow system according to the invention with a transport module according to the invention, FIG. 2 shows a plan view of an example of an arrangement of transport modules for a material flow transport system, and in order to illustrate the advantages of reservation for a specific time, FIG. 3a to FIG. 3c show further examples of a material flow system having a multiplicity of sources (that is to say goods pack starting places) and sinks (that is to say goods pack destinations), as well as a plurality of transport modules, which are arranged in different topologies and are individually numbered sequentially, FIG. 4 shows the theoretically determined throughout for the topology shown in the inserted figure, comprising individual transport modules, further pack sources and goods pack sinks, depending on the overall filling level, FIG. 5 shows a topology in which a deadlock situation can occur (on the left) by sending a circulating path from a source E, and the same topology, but in which case the critical module 7, which is intended to receive goods packs from a plurality of goods pack senders, is designed to prevent deadlocks (on the right), and FIG. 6 shows the respective throughputs which result from the arrangements shown in FIG. 5, as a function of the system filling level.

As shown in FIG. 1, a material flow system 1, which is annotated 1 in general, comprises a multiplicity of multidirectional transport modules 2, which are provided with a control system (not shown), and an interface 3a, 3b for communication with other transport modules, with the transport module 2 being designed to transport a goods pack 4 in a given goods pack movement direction 5a, 5a", 5b, 5b" as indicated by arrows 5.

The material flow system according to the present invention can be formed by linking and arranging alongside one another a multiplicity of multidirectional transport modules 2, as desired, in different topologies, in which case, in addition to the transport modules 2 according to the invention, it is also possible to provide further transport routes, for example a roller path 6; if required, the corresponding conventional transport routes 6 are also addressed and/or managed in terms of a goods pack transport time to be taken into account, occupancy etc., by a multidirectional transport module associated therewith; this reduces the number of complex transport modules over long routes. Without any intention of restriction, examples of topologies are illustrated in FIGS. 3a to 3c and in FIG. 5 (on the left) and 5 (on the right).

The individual transport module has a logic interface in the control system, which logic interface can communicate with respective interfaces of the neighboring modules via a plurality of outputs 3a, 3b, and corresponding outputs, which are not shown, on the other two sides; the interchange of data via this interface will also be described further below.

Furthermore, the transport module 2 has an RFID sensor 7, which is used for identification of a received goods pack 4, with the RFID sensor signals being passed to the control system, which is designed to control the drives for passing on a goods pack 4 in one of the directions 5a, or the opposite direction 5a' associated with this, or the direction 5b or the opposite direction 5b' associated with it.

To this extent, the transport module 2 is autonomous and does not require any link to a central computer; it is possible, per se, to receive power, and/or to pass it on, via the interfaces; however, particularly when relatively heavy packs have to be transported quickly, that is to say high drive power levels are required, it is preferable for the multidirectional transport modules 2 to be provided with their own mains connection.

The control system (not shown) is designed on the one hand to obtain topology information relating to the topology of the material flow system in which the respective transport module is currently installed, and on the other hand to pass on a goods pack using the topology information and information received via the interface 3 at the physical inputs and outputs 3a and 3b, as well as the physical inputs and outputs, which are not shown, of neighboring modules. For example, the control system can be implemented at low cost by means of microcontrollers, each of which have correspondingly associated memories for the topology information, for operation of the drive 25/1, etc., and which can correctly control the modules' own drives.

The system can be operated as follows:

First of all, an individual transport module will signal its own identity to the respectively connected neighboring modules and, in response, will receive the identity of the neighboring modules. In a second step, the information obtained so far is then in turn passed on. A neighboring module, which is located on the left alongside the module, therefore receives not only the identity of the immediately adjacent transport module, but also the identity and position of the modules located to the right of it and, possibly, of the modules arranged above and below. This process continues until no more new modules are detected, which indicates that the topology has been recorded completely. The corresponding information can be stored, to be precise in such a way that the routes to a module further away are stored completely.

The control system in the module can now decide, when it is requested to pass on a goods pack to a specific destination, which of the module neighbors it will address for potential handover. Starting from a source where the goods packs are input, this makes it possible to define the route along which a goods pack should be transported. To this extent, reference is expressly made to known routing algorithms, for example from the field of electronics layout and/or IT. For this purpose, a goods pack source will send an advance reservation token to a first port, with the request to determine whether the neighboring module is ready to accept a pack. If this neighboring module is not itself the destination, an advance reservation is made to the neighboring module and a request is made to a neighboring module, which is considered to be suitable in turn on the basis of the topology information which has been set up, to determine whether this will be ready to accept the goods pack if necessary. This process continues until the advance reservation request finally reaches the destination module. If this is the case, and the destination module is ready for acceptance, the advance reservations can be confirmed along the route that has been set up, with these advance reservations being converted to reservations, and the confirmations being passed back again to the goods pack source, in response to which this sends the pack along the confirmed route.

If, in contrast, one of the transport modules addressed by the advance reservation is not ready for acceptance, for example because the module will already be busy at the expected arrival time, a corresponding acknowledgement can be sent back to the start module. In a situation such as this, an attempt can be made to set up a different route in a transport module located closer to the start module. For this purpose, the advance reservation request, that is to say the advance reservation token, is sent to a neighboring module other than that previously addressed. This results in a gradual determination of whether a route can be set up.

This makes it possible to find a route for transporting a goods pack from a source to a destination. If this is not achieved in a first attempt, for example because all of the transport routes are busy because of an extremely high load level in the material flow system, a second attempt is typically made to set up a route. If required, this second attempt can be made with a short delay, which is based on the time constants with which the system carries out its transport, that is to say for example depending on the routes and the transport speeds along the system. If no route can be set up even after several attempts, for example in the situation when a plurality of transport modules have failed, an alarm can be output.

It is advantageous for the reservation also to be used to signal when, for example, the arrival of the goods pack can be expected. This is illustrated in FIG. 2. In this case a goods pack is intended to be sent from a point 1 to a point 9, while a pack is at the same being transported transversely from a point 2 to a point 5, to be precise via the modules 8, 7 and 6. If both packs are sent at the same time and each module requires the same time for transporting the respective goods pack further, there will be no adverse effect, as is indicated by the times $t_1$, $t_2$ shown on the respective modules. Both packs can therefore be transported at the same time, provided that the input and output times are taken into account in the module reservation. This is therefore preferred.

The system allows high throughputs to be achieved. This is illustrated in FIG. 4, for a herringbone topology. This figure shows the throughput at a specific transport speed, as a function of the filling level. The throughput reaches its maximum from about 25%, where it remains approximately. The appearance is different when situations can occur in which modules in the material flow system can impede one another. In situations such as this, a deadlock can occur, when none of the modules is any longer able to still accept a pack. Such a deadlock can be prevented for at least one module, the module 7 shown on the right in FIG. 5, when further goods packs are fed in. FIG. 6 shows the effect on the throughput.

The invention claimed is:

1. A method for controlling a material flow system, comprising:
    transporting goods packages on conveyor modules that communicate with one other in order to autonomously negotiate material flow paths from a goods package start to a goods package destination;
    reserving modules for transport of a particular, identified goods package; and
    releasing the reserved modules after transport of the particular, identified goods package,
    wherein the modules self-reserve by accepting a pre-reservation token, where pre-reservation is effected upon token acceptance, the pre-reservation token being forwarded, and, upon confirmation of the pre-reservation by a downstream conveyor module, the pre-reservation being matured into a reservation, and
    wherein the modules are reserved for the transport of a goods package at a particular time or in a particular period.

2. The method according to claim 1, wherein successively arriving goods packages on at least one module are transported in respective opposite directions.

3. The method according to claim 1, wherein the goods packages on at least one module are transported in a direction that is selected from at least four possible directions including forward, backward, left, and right.

4. The method according to claim 1, further comprising identifying the goods packages on at least one module using at least one of a barcode reader, an RFID transponder, a weight sensor, a size sensor, a color sensor, and a camera with image recognition.

5. The method according to claim 1, further comprising reserving a material flow path of the material flow paths using next neighbor communication paths including using an interface that has a respective input/output for each next neighbor connection.

6. The method according to claim 1, wherein topology information about the material flow system is complemented and/or updated on at least one module via conveyor modules communication including routing table exchange, and via storing received topology information on the at least one module locally.

7. The method according to claim 6, further comprising outputting pre-reservation tokens to modules that, based on stored topology information, are closer to the destination than a module that outputs pre-reservation tokens.

8. The method according to claim 6, wherein the pre-reservation token is forwarded in accordance with the goods package destination that is coded in the pre-reservation token and in accordance with the stored topology information including the topology information stored in a routing table.

9. The method according to claim 1, wherein when a first downstream conveyor module is busy, the first downstream conveyor module outputs a pre-reservation token denial, and a second downstream conveyor module, upon receiving the pre-reservation token denial, sends the pre-reservation token associated with the pre-reservation token denial to other neighboring modules that lead to the goods package destination based on stored topology information, and wherein following reception of pre-reservation denials by all or a predetermined number of the neighboring modules, a pre-reservation denial is autonomously sent to an upstream conveyor module and the pre-reservation token associated with the pre-reservation token denial is cancelled.

10. The method according to claim 1, further comprising interchanging between modules parameters that are relevant to the conveyance of the goods packages, the parameters including maximum admissible accelerations.

11. The method according to claim 1, further comprising denying a pre-reservation and sending a denial message upon repeated receipt of a pre-reservation token for a particular goods package.

12. The method according to claim 1, wherein the reservation prompts one or more other reservations to be denied, at least intermittently in a direction opposite to a direction of the reservation.

13. The method according to claim 1, wherein the modules send a use and/or reservation condition thereof to at least one inward-transfer and/or outward transfer module that can also be used for inward or outward transfer, and wherein the inward transfer and outward-transfer modules transfer inward and/or transfer outward based on a filling level of the material flow system by prioritizing the outward transfer when there is a high filling level.

14. A multidirectional conveyor module that performs the method of claim 1, the multidirectional conveyor module comprising:

a controller for the direction of movement of the goods packages and an interface for communicating with other conveyor modules, wherein, in order to carry out the method according to claim 1, the controller has a memory for reservation data adapted to be used for reserving the conveyor module for the transport of at least one goods package in a given direction of movement of goods packages in response to signals received by the interface for a particular, future goods package arrival time on the conveyor module and/or a corresponding, particular future period, so as to allow the modules to be reserved for the transport of a particular, identified goods package and to be released after the transport of the particular, identifiable goods package, wherein the modules are reserved by virtue of the pre-reservation token being accepted, the pre-reservation being effected on token acceptance, the pre-reservation token being forwarded and, upon confirmation of the pre-reservation by the downstream conveyor module, the pre-reservation matures into the reservation, and wherein the modules are reserved for the transport of the goods package at the particular time or in the particular period.

15. A material flow system comprising a plurality of conveyor modules according to claim 1.

* * * * *